May 25, 1965
M. ANTON
3,184,922
METHOD OF AND MEANS FOR STORING LIQUEFIED
PETROLEUM GASES UNDERGROUND
Filed July 12, 1960
2 Sheets-Sheet 2
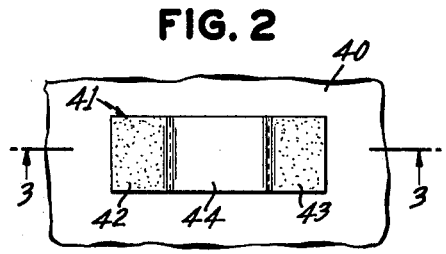
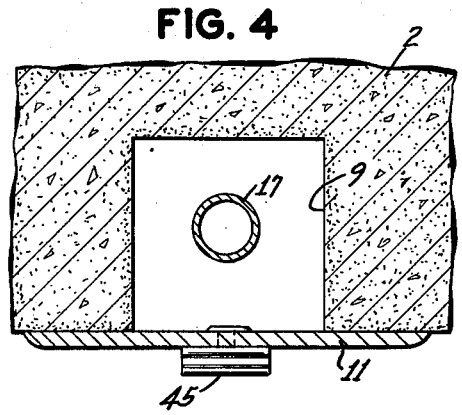
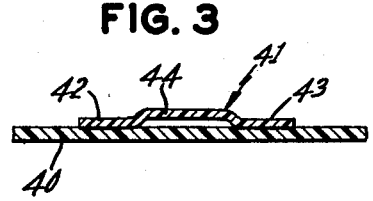
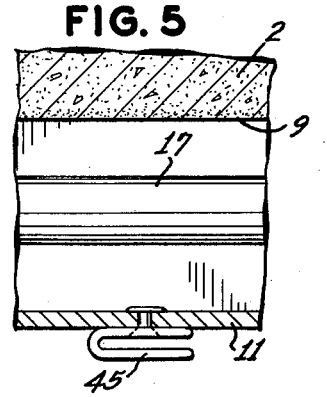
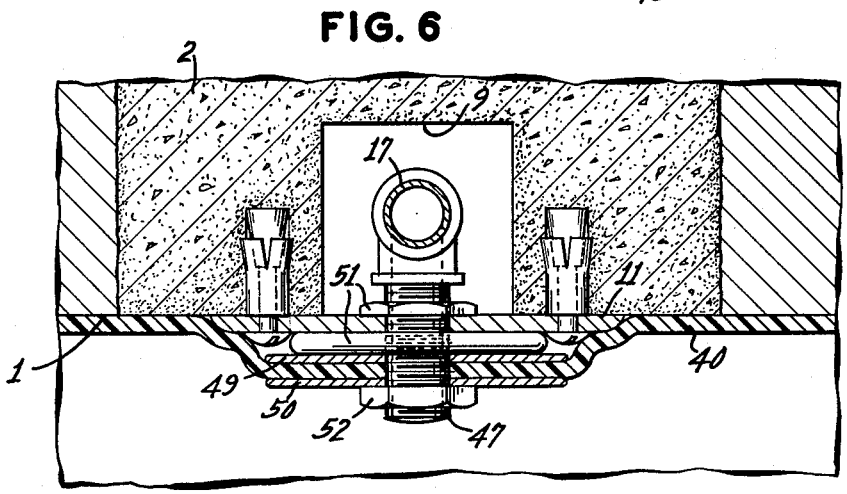
INVENTOR.
MARK ANTON
BY
*Pennie Edmonds Morton Barrows & Taylor*
ATTORNEYS

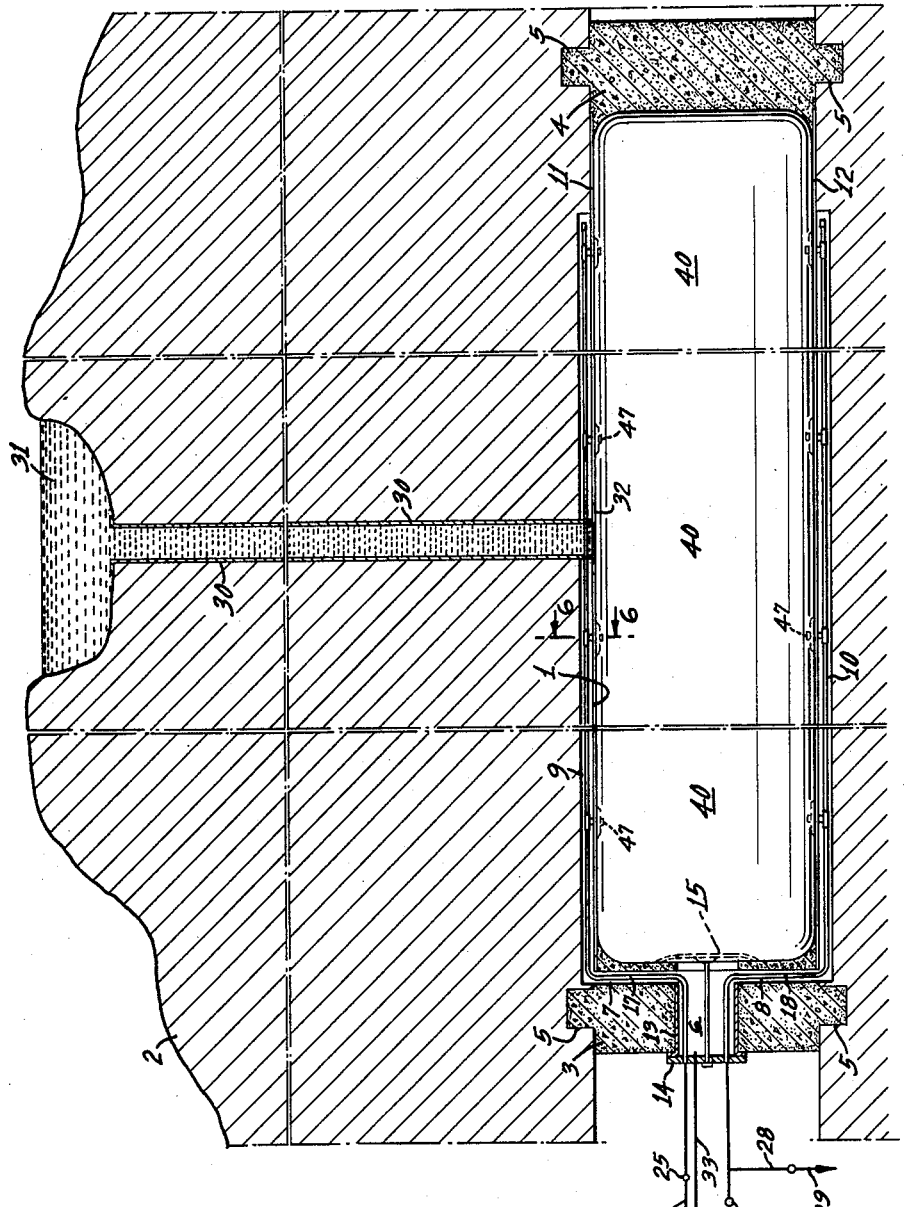

United States Patent Office 3,184,922
Patented May 25, 1965

3,184,922
METHOD OF AND MEANS FOR STORING LIQUEFIED PETROLEUM GASES UNDERGROUND
Mark Anton, West Orange, N.J., assignor to Suburban Propane Gas Corporation, Whippany, N.J., a corporation of New Jersey
Filed July 12, 1960, Ser. No. 42,266
8 Claims. (Cl. 61—.5)

This invention relates to improvements in the underground storage of liquefied petroleum gases, such as liquid propane gas, commonly referred to as L.P.-Gas, and includes an improved method or system and improved means or apparatus for such storage.

More particularly, the invention relates to improvements in the underground storage of such liquefied petroleum gases in underground cavities, such as, for example, abandoned railroad tunnels in a hill or mountain.

According to the present invention, a sealed underground cavity is provided with an oversized liner or container for the liquefied gas, made of a resilient material such as plastic or synthetic rubber which is impervious and resistant to liquefied petroleum gas, and which, in its expanded state, is larger than the cavity and supported by the walls of the cavity, and which is capable of contracting and of expanding from its collapsed condition, together with means for supplying the liquefied gas to the container and for discharging the liquefied gas therefrom; and with means for supplying to the cavity, outside the container, hydraulic pressure which is equal to or nearly equal to the pressure of the liquefied gas in the container.

The underground cavities in which the L.P.-Gas containers are located are advantageously horizontal or nearly so and sealed so that they can withstand hydraulic pressure in amount similar to that of the L.P.-Gas in the containers, and the cavities are provided with means for supplying a liquid, such as water, to the cavity around the L.P.-Gas containers and for maintaining such liquid at the desired hydraulic pressure or head.

The liner or container is completely closed except for pipe and hose attachments; it is larger than the cavity so that in its expanded state it is able to conform to reasonable irregularities of the cavity and is supported by the walls of the cavity without being subjected to high tensile strains. The material of the liner is impervious and resistant to the actions of L.P.-Gas and other elements in its environment. It would be of a resilient material such as plastic or rubber in their fabricated state or they could be reinforced by another material such as nylon. The liner is capable of expanding and collapsing within the cavity from being completely collapsed to the position where it would conform completely to the contour of the cavity itself.

The containers are suitably supported from the top of the cavity in a number of places and provision is made for supplying L.P.-Gas to the top of the container and for removing L.P.-Gas therefrom. The containers are also advantageously secured to the bottom of the cavity and with provision for introducing L.P.-Gas or water to the bottom of the container or withdrawing L.P.-Gas or water therefrom.

Since the L.P.-Gas is lighter than water, the L.P.-Gas will rise to the top of the container when water is used as the hydraulic fluid between the container and the cavity and when the container is partly collapsed. It should be noted that the specific gravity of water is nearly double that of the liquefied gas. Thus, when the container is partly collapsed, it is the bottom portion of the container which is collapsed and the upper portion will contain the L.P.-Gas while the water will fill the lower portion of the cavity outside the lower portion of the collapsed container.

According to one form or embodiment of the invention, only the L.P.-Gas is contained in the container and the L.P.-Gas is kept dry and does not come into contact with water. If the pressure of the hydraulic liquid outside the container is less than the pressure of the L.P.-Gas in the container, the container will not collapse but will fill the cavity and remain in its expanded condition supported by the walls of the cavity. In this case, provision is made for supplying the L.P.-Gas, or liquefied gas plus compressed gas, to the container and for removing the liquefied gas therefrom, such as connections and pumps or compressors. Thus in filling the containers, e.g., from tank cars of the L.P.-Gas, the L.P.-Gas can be pumped into the containers from the tank car or forced by gas pressure on the top of the tank car into the containers. When the L.P.-Gas is to be withdrawn from the container, e.g., to a tank car or tank truck, the L.P.-Gas can be pumped from the container into the tank or tank truck or gas pressure can be supplied to the gas space of the container to force the L.P.-Gas into the car or truck.

A somewhat different method of operation is used, when only L.P.-Gas is in the container, and when the pressure of the hydraulic liquid surrounding the container is controlled so that it is equal to or somewhat greater than that of the L.P.-Gas in the container. When the container is full of the L.P.-Gas, it will fill the cavity and remain in its expanded condition supported by the walls of the cavity. When L.P.-Gas is to be discharged from the container, water pressure applied to the cavity outside the container will force the L.P.-Gas out through the top connections, e.g., into a tank car or tank truck, and this can readily be accomplished by pumping hydraulic liquid into the cavity to force out the L.P.-Gas from the container. In the reverse operation, when the tank is to be filled with the L.P.-Gas, it will be pumped into the container and provision will be made for releasing hydraulic liquid from the cavity to permit the collapsible tank to expand.

In another embodiment of the invention, the container is connected with a supply of both liquid gas at the top and water at the bottom, and the container is maintained full and prevented from collapsing so that it forms an oversized liner or container for the cavity. In this case, if the container is first filled with water, the L.P.-Gas is pumped into the top of the container and water is forced out of the bottom of the container until it is completely filled or to the desired extent with the L.P.-Gas. When L.P.-Gas is to be discharged from the container, water is pumped into the bottom of the container to force the L.P.-Gas out through the top.

The hydraulic pressure in the cavity outside the container will be regulated and controlled depending upon whether the container is to contain only L.P.-Gas, or both L.P.-Gas and water. When only L.P.-Gas is in the container the hydraulic liquid in the cavity outside the container will have its pressure regulated and will be controlled in its admission and discharge from the cavity to permit the L.P.-Gas to be forced into the container, or to force the L.P.-Gas therefrom, as above indicated. Provision will be made in this case for supplying water to the cavity to force the L.P.-Gas out of the container with resulting partial collapsing of the container; and provision will also be made for withdrawing water as required when L.P.-Gas is forced into the container.

Where the oversized container fills the cavity and is kept full with L.P.-Gas and water, the container will be supported by the walls of the cavity. In this case the hydraulic pressure outside the container may not be necessary.

But even where the container fills the cavity, it is advantageous in some cases to provide hydraulic fluid to the cavity and means for distributing it around the cavity at a pressure similar to or somewhat less than the pressure of the L.P.-Gas in the container, so that where the cavity is porous in nature, the hydraulic pressure will provide a counterbalancing pressure and reduce strains which might otherwise be applied to the container.

The hydraulic liquid in the cavity surrounding the container can be supplied in various ways. If the cavity is a tunnel through a hill or mountain, a vertical column of water expanded upwardly from the cavity for a sufficient height to supply the hydrostatic pressure can be used, with variations in the hydrostatic head as required. Alternatively, a standpipe, or standpipe and tank, located entirely outside the cavity but connected thereto, can provide a regulated hydrostatic pressure. The necessary hydraulic pressure can also be supplied by a pump which is set to pump water into the cavity at a predetermined pressure and which will maintain the necessary hydrostatic pressure, or variations in hydraulic pressure, as required.

As the pressure of the L.P.-Gas is known, the hydraulic pressure can be readily regulated to approximately the same degree. Pressure gauges can be connected with the container and with the hydraulic liquid outside the container to show these respective pressures and to enable them to be kept within the proper limits.

A single large container or liner can be located in a single large cavity. Or the cavity can be sub-divided by bulkheads into smaller cavities, each with its collapsible container.

The cavity in which the container is located and supported should have a smooth or relatively smooth inner surface, free from sharp changes in contour, to support the container. Any large fissures or cracks should be grouted and any sharp changes of contour in the cavity should be eliminated. The cavities may advantageously be long tunnels, e.g., of 10 to 20 feet in diameter or cross-section and closed by suitable bulkheads at the ends, or at intermediate points where a series of cavities is to be provided.

The bulkhead at one end is advantageously made with a manway to which access can be had to the cavity and through which connecting piping can be located.

In order to provide connections with the container at a number of places along the top of the cavity, a channel is advantageously made lengthwise of the cavity through which a pipe is passed with branches entering the container at different places. This cavity is closed with a steel plate to protect the liner from the sharp changes in section. Such a channel can be rectangular and only large enough to contain the pipe or pipes. A similar channel can be located at the bottom of the cavity for pipes to be located at this point and with branches connected to the bottom of the container and similarly covered by a steel plate to protect the liner from sharp changes in section.

In order to support the container from the top of the cavity, a number of supporting strips are advantageously cemented at spaced distances to the top of the container, these strips being cemented to the container at their ends and forming a loop which can be hung on and supported by supporting elements or flat hooks secured to the top of the cavity. Similar supporting means may be provided for securing the bottom of the container to the bottom of the cavity.

In that form of the invention where provision is made for supplying both L.P.-Gas and water to the inside of the container, the container will be filled with liquid at all times. It will be filled with water only when the container is empty of liquefied gas and the amount of water will vary from that amount to the condition where the container is full of the L.P.-Gas. The outside connections in such cases include pipes connected to the top and bottom of the container and pumps connected with each of these pipes. Water will be pumped in through the lower pipe to displace the L.P.-Gas when it is needed to be recovered from the underground storage. The water will displace the L.P.-Gas forcing it out through the top of the container and connecting piping to a receiving storage container. In the reverse operation, the L.P.-Gas will be pumped into the top of the tank and water will be forced out through the bottom, e.g., through a check valve set at a predetermined pressure.

When the underground storage is operated without the introduction of water into the container, and when the hydraulic pressure outside the container is less than that of the gas in the container, a pump and compressor can be used. By forcing gas under pressure into the top of the container, the L.P.-Gas will be forced out through the bottom connection into the receiving tank. When the underground container is being filled, the L.P.-Gas can be pumped directly into the tank or forced in by gas pressure applied to, e.g., a tank car of the L.P.-Gas to force it into the underground storage container.

Another method of operation, when water is not introduced into the tank, is by pumping hydraulic liquid into the cavity outside the tank to cause the tank to collapse and to force the L.P.-Gas out through the top connecting pipe into the receiving tank. In the reverse operation, the L.P.-Gas will be pumped into the container and hydraulic liquid will be forced out of the cavity through a suitable relief valve or connection.

The invention will be further described in connection with the accompanying drawings which illustrate in a somewhat conventional and diagrammatic manner, and not to scale, one form of the invention. It will be understood that the invention is not limited thereto.

In the accompanying drawings:

FIG. 1 is a diagrammatic drawing, not intended to be a scale drawing, showing a cavity with the liner or container therein and the connecting piping for the container and for the cavity;

FIG. 2 shows a section of the container with a supporting strap thereon;

FIG. 3 is a section taken on the line 3—3 of FIG. 2;

FIG. 4 is a section of the portion of the cavity with pipe-containing channel, and shows one form of supporting member for such straps;

FIG. 5 is a view of the apparatus through the cavity and channel and above the supporting member, the view being a sectional view taken at right angles to that of FIG. 4; and FIG. 6 is a view taken on the line 6—6 of FIG. 1 showing one way of connecting the supply and discharge piping with the container.

Referring first to FIG. 1, an underground storage cavity is indicated conventionally at 1, such as an abandoned railroad tunnel passing through a hill or mountain 2. This cavity is closed at one end by a reinforced concrete bulkhead 3 and at the other end by a reinforced concrete bulkhead 4, each of these bulkheads having reinforced concrete keys 5 tying them into the surrounding portion of the cavity to form a joint capable of withstanding the necessary hydraulic pressure.

Bulkhead 3 is provided with a manway 6 through which access is gained to the cavity and through which connecting pipes pass. Conduits 7 and 8 are built into the bulkhead at the time the cement is poured and which connect with the manway 6 and with channels 9 and 10 cut in the top and bottom of the container or cavity. The channels 9 and 10 are covered by steel plates 11 and 12, respectively.

The manway 6 is provided with a lining 13 to which the outer cover plate 14 is secured and with another cover plate 15 on the inside.

A pipe 17 passes through the outer manway and through the conduit 7 in the bulkhead and through the channel 9 at the top of the cavity. A similar pipe 18 passes through the outer cover plate and through the channel 8 in the bulkhead and through the channel 10 at the bottom of the cavity.

The pipe 17 outside the cover plate has a control valve 19, an excess flow valve 21 and a relief valve 25, and is connected to the pump 23. The pipe 18 outside the cover plate has a control valve 20 and an excess flow valve 22, and is connected to the pump 24. The pipe 17 also has a connecting pipe 26 with control valve 27 therein leading to a supply or receiving tank for L.P.-Gas. The pipe 18 also has a branch pipe 28 with control valve 29 therein for introduction or discharge of water or of L.P.-Gas.

The cavity is connected with a supply of hydraulic fluid such as water at a regulated pressure corresponding to that of the L.P.-Gas in the container, or somewhat greater or somewhat less than such pressure, and with means for regulating the hydraulic pressure. One provision illustrated is a standpipe or riser 30 terminating in a pond 31 at the top of the hill or mountain and which will contain a head of water which can be regulated so that it corresponds approximately to the pressure of the L.P.-Gas in the tank or can be varied somewhat therefrom. Such a standpipe is only an illustrated method of maintaining the water pressure. The lower end of the riser 30 has a perforated plate 32 to prevent the container from entering the riser while permitting flow of hydraulic fluid therethrough.

Another method of maintaining hydraulic pressure in the cavity, as an alternative to the standpipe or riser 30, is also illustrated. The hydraulic fluid pipe 33 is connected with the cavity through the cover plate 14 and has a relief valve 34 and a control valve 35. This hydraulic pipe leads either to an outside standpipe or water tank of a sufficiently high elevation (not shown), or to a pump (not shown) connected with a supply of hydraulic liquid such as water for pumping the same into the cavity to maintain a predetermined hydraulic pressure therein, while the relief valve permits discharge of water from the cavity at a predetermined pressure when this is desired.

Within the cavity is a resilient and collapsible liner or tank indicated generally at 40, which is larger in size than the cavity in which it is located, so that, when the container fills the cavity, it will be supported thereby but its oversize nature will protect it from tension and permit it to adjust itself to irregularities in the lining of the cavity. The cavity has a relatively smooth inner surface, free from sharp changes in contour, to support the container.

Provision is made for supporting the container from the top of the cavity at a number of different places. One form of support is illustrated in the drawings. As shown in FIGS. 2 and 3, a strip 41 of material is cemented at its ends 42 and 43 to the container 40, leaving the central portion 44 free to permit the insertion of a supporting member or hook 45, such as illustrated in FIGS. 4 and 5. The hook 45 shown in these figures is secured at the top to the cover plate 11 and has a horizontal U-shape with the lower portion of the hook adapted to support the strap 41 and that portion of the container to which the strap is secured when the loop 44 of the strap is passed over the bottom portion of the hook. A series of such hooks can be located at spaced distances along the cover plate 11 which covers the channel 9, and similar hooks (not shown) can be secured at different places in the top of the cavity to support the container at a sufficient number of points. Similar supporting hooks can be secured to the bottom cover plate 12 to hold the central portion of the bottom of the container in place while other portions of the bottom of the container are left unsecured, so that the container can collapse from its full condition to a partly full condition.

Connections are made with the pipe 17 at the top of the cavity, and with the pipe 18 at the bottom of the cavity, through branch pipes 47, illustrated in FIG. 6, which pass through openings in the cover plates 11 and 12 and which pass through openings in the container and are secured thereto. As illustrated in FIG. 6, the container 40 has reinforcing strips 49 and 50 secured thereto around the opening, and holding members 51 and 52 are threaded to the pipe 47 and clamp the reinforced portion of the container between them.

A number of such branch pipes can be located at the top of the container and at the bottom of the container to permit introduction or withdrawal of liquid therethrough.

In the construction of the apparatus illustrated, the cavity will be first prepared for the container by providing it with a concrete lining, if necessary, to free it from sharp changes in section, and to give a substantially uniform cross-section, so that the cavity will be of substantially uniform cross-section throughout its length. The channels at the top and bottom of the cavity will be provided for receiving the piping. The bulkheads will be constructed and the piping will be located in the bulkhead 3 and in the channels at the top and bottom of the cavity with branch pipes at suitable distances apart for connection with the container. The cover plates for the top and bottom channels will have openings for the passage of the branch pipes therethrough, and will have hooks or other suitable supporting means for securing the container at suitably spaced distances. These cover plates may be perforated to permit circulation of hydraulic liquid therethrough.

The container can be fabricated outside the cavity and of a size which is greater than that of the cavity and will be provided with supporting means such as the straps above described for supporting the container at spaced intervals from the top and bottom of the cavity.

The container will also be provided with openings at spaced distances for connection with the branch pipes for the supply and removal of liquid. And the container will be secured to the branch pipes. One end of the container can be left open to permit a man to enter the cavity from inside the container, e.g., to secure the branch pipes to the container and to see that the container is of sufficient oversize with respect to the cavity in which it is located, and this open end can be closed after the container is secured in place in the cavity.

When the container is completed, properly supported and connected with the pipes, the inner manway cover 15 is secured in place, the outer manway cover plate is also secured in place, and the pipes are connected. The testing of the container can be accomplished by introducing compressed air under sufficient pressure to insure that the container is free from imperfections or will hold the necessary pressure.

In the apparatus illustrated, pressure indicating devices in the cavity outside the container and in the container are not shown. Nor is provision shown for regulating the head of hydraulic liquid in the riser 30 or in the outside hydraulic standpipe or water tank and for varying it to correspond to the pressure within the container or somewhat more or somewhat less than such pressure. Nor are sensing devices nor level indicators shown for indicating the level of liquid in the container or the level of water when it also is present in the container. But these devices can readily be provided.

In the operation of the apparatus, the cavity will have been first prepared and is advantageously a sealed cavity which will withstand hydraulic pressure without leakage of the hydraulic liquid. It may thus be lined with concrete or, if the cavity is through a rock formation, and if seams or cracks or other irregularities exist, they can be sealed or filled with concrete. And the bulkheads should be such as to withstand the necessary hydraulic pressure.

When the system is first started in operation, if water is to be used in the container, it can be filled with water until the container fills the cavity and is supported thereby. And the container can thus be tested for leaks if the hydraulic pressure outside the container is less than that inside. When the container fills the cavity, there will be little hydraulic liquid around the cavity. But if the cavity is porous, provision for hydraulic liquid will help maintain a proper supporting pressure for the container.

Assuming the container is first filled with water, the L.P.-gas can then be pumped or forced into the top of the container, forcing the water out of the bottom of the container until the container is filled partially or completely with the L.P.-Gas. When L.P.-Gas is to be discharged from the container, water can be pumped into the bottom of the container and L.P.-Gas forced out the top.

If water is not to be used in the container, then the L.P.-Gas will be supplied thereto. And if the container has hydraulic liquid between it and the cavity, this will be forced out until the container is more or less completely filled with the L.P.-Gas. When the L.P.-Gas is to be withdrawn from the container, hydraulic liquid can be pumped into the cavity outside the container to force L.P.-Gas out the top of the container. Or, if the hydraulic pressure outside the container is less than that of the L.P.-Gas, high pressure gas can be forced into the top of the container to force L.P.-Gas out at the bottom and into the desired outside L.P.-Gas receptacle such as a tank, car or truck.

It is one advantage of the process and system of the present invention that large amounts of L.P.-Gas can be stored underground in the wintertime and withdrawn therefrom during the summertime when the demand increases. In a cavity 400 or 500 ft. long or longer, and 15 to 20 ft. or more in diameter or cross-section, a single plastic tank can be used for the entire cavity. Or a number of bulkheads can be introduced to form a number of cavities, each with its liner or container.

I claim:
1. Means for the underground storage of liquefied petroleum gases, including a sealed underground cavity having a predetermined surface area, an oversize collapsible container positioned in said cavity for holding liquefied gases and having a wall surface area greater than the surface area of said cavity when the wall is substantially free of tensile strains, means for supplying and discharging liquefied gas to and from the container, separate means for supplying and discharging pressurized fluid to and from said container, and pressure control means for maintaining said container filled and the walls thereof in engagement with the walls of said cavity as said liquefied gas is supplied to and discharged from said container.

2. Means for the underground storage of liquefied petroleum gases as set forth in claim 1, in which the container has connections at the top for the supply and discharge of liquefied gas and at the bottom for the discharge and supply of hydraulic liquid.

3. Means for the underground storage of liquefied petroleum gases as set forth in claim 1, having means for supplying hydraulic liquid to the cavity outside the container.

4. Means for the underground storage of liquefied petroleum gases as set fort hin claim 1, in which the cavity has a recess at the top with branch pipes connecting with the container at different locations for the supply thereto and withdrawal therefrom of liquefied gas.

5. Means for the underground storage of liquefied petroleum gases as set forth in claim 4, in which the cavity has a recess at the bottom containing a pipe with branch pipes connected with the bottom of the container for supplying hydraulic fluid to, and withdrawing hydraulic fluid from, the container.

6. The method of storing liquefied petroleum gases in a collapsible container disposed within a substantially closed underground cavity and having a wall surface area greater than the surface area of said cavity when said wall is substantially free of tensile strains comprising the steps of: providing said container with first connections ofr introducing liquefied gas thereto and for removing liquefied gas therefrom, providing the container with second connections for introducing and withdrawing hydraulic liquid, maintaining the container filled with hydraulic liquid when no liquefied gas is contained therein, charging the container with liquefied gas by forcing it into the said first connection while releasing hydraulic liquid from said second connection, and holding said container against the walls of said cavity by pressure exerted from within said container during the charging of the container with liquefied gas.

7. The process according to claim 6, in which liquefied gas in the container is forced out of the top thereof by the introduction of hydraulic fluid into the bottom of the container.

8. The method of storing liquefied petroleum gases in a collapsible container disposed within a substantially closed underground cavity and having a wall surface area greater than the surface area of said cavity when said wall is substantially free of tensile strains comprising the steps of filling said container with a hydraulic fluid until the walls thereof are in engagement with the walls of the cavity, charging the container with liquefied gas while simultaneously releasing a substantially equal amount of said hydraulic fluid and maintaining said container filled during any subsequent change in the amount of liquefied gas in the container.

References Cited by the Examiner
UNITED STATES PATENTS

| 703,824 | 7/02 | Quinn | 61—0.5 X |
| 1,162,572 | 11/15 | Clark. | |
| 2,211,958 | 8/40 | Mahaffey. | |
| 2,747,774 | 5/56 | Breitenbach. | |
| 2,869,328 | 1/59 | Gibson et al. | 61—.5 |
| 2,947,147 | 8/60 | Johnson | 61—0.5 |
| 3,068,561 | 12/62 | Jones | 50—100 X |

OTHER REFERENCES

Modern Plastics, May 1955, page 191.

EARL J. WITMER, *Primary Examiner.*

WILLIAM I. MUSHAKE, JACOB L. NACKENOFF,
*Examiners.*